United States Patent [19]

Stiling et al.

[11] 4,057,443
[45] Nov. 8, 1977

[54] FOAMED GYPSUM WALLBOARD

[75] Inventors: Rodney A. Stiling, Snyder; Edward A. Burkard, East Amherst; Robert M. Johnson, Kenmore, all of N.Y.

[73] Assignee: National Gypsum Company, Buffalo, N.Y.

[21] Appl. No.: 716,239

[22] Filed: Aug. 20, 1976

[51] Int. Cl.$^2$ ............................................. B32B 5/20
[52] U.S. Cl. .................... 156/43; 156/346; 366/3; 366/11; 264/50; 416/237
[58] Field of Search ............... 156/39, 43, 346; 259/8, 259/147, 151; 264/42, 50; 416/223 R, 228, 237, 234; 209/169

[56] References Cited

U.S. PATENT DOCUMENTS

| | | | |
|---|---|---|---|
| 1,660,402 | 2/1928 | Thomson | 259/147 |
| 2,079,565 | 5/1937 | Roos et al. | 259/151 |
| 2,243,302 | 5/1941 | Weinig | 209/169 X |
| 2,451,445 | 10/1948 | Parsons | 264/50 X |
| 3,290,016 | 12/1966 | Lennon et al. | 416/228 |
| 3,376,024 | 4/1968 | Beechler et al. | 416/237 X |
| 3,459,620 | 8/1969 | McCleary et al. | 259/8 X |
| 3,638,917 | 2/1972 | Osten | 259/8 |

FOREIGN PATENT DOCUMENTS 1,107,660  1/1956  France ........................ 156/43

Primary Examiner—David A. Simmons
Attorney, Agent, or Firm—Robert F. Hause

[57] ABSTRACT

Lightweight gypsum wallboard produced by continuously combining a small amount of surface active agent with a liquid stream which stream is made up of substantially all of the liquids to be used in the manufacture of a continuous web of gypsum wallboard, subjecting this mixture to an intense agitation with vaned saw tooth-like rotary blades in a foam generator while adding a controlled quantity of air thereto, forming a uniformly dispersed foam of very small bubbles from the liquid by completely generating all of the surface active agent therein to form this foam, and mixing this foamed liquid with finely ground dry calcined gypsum in a suitable mixing device to form a foamed settable gypsum slurry, disposing the slurry between paper cover sheets, and forming a continuous web of gypsum wallboard.

5 Claims, 3 Drawing Figures

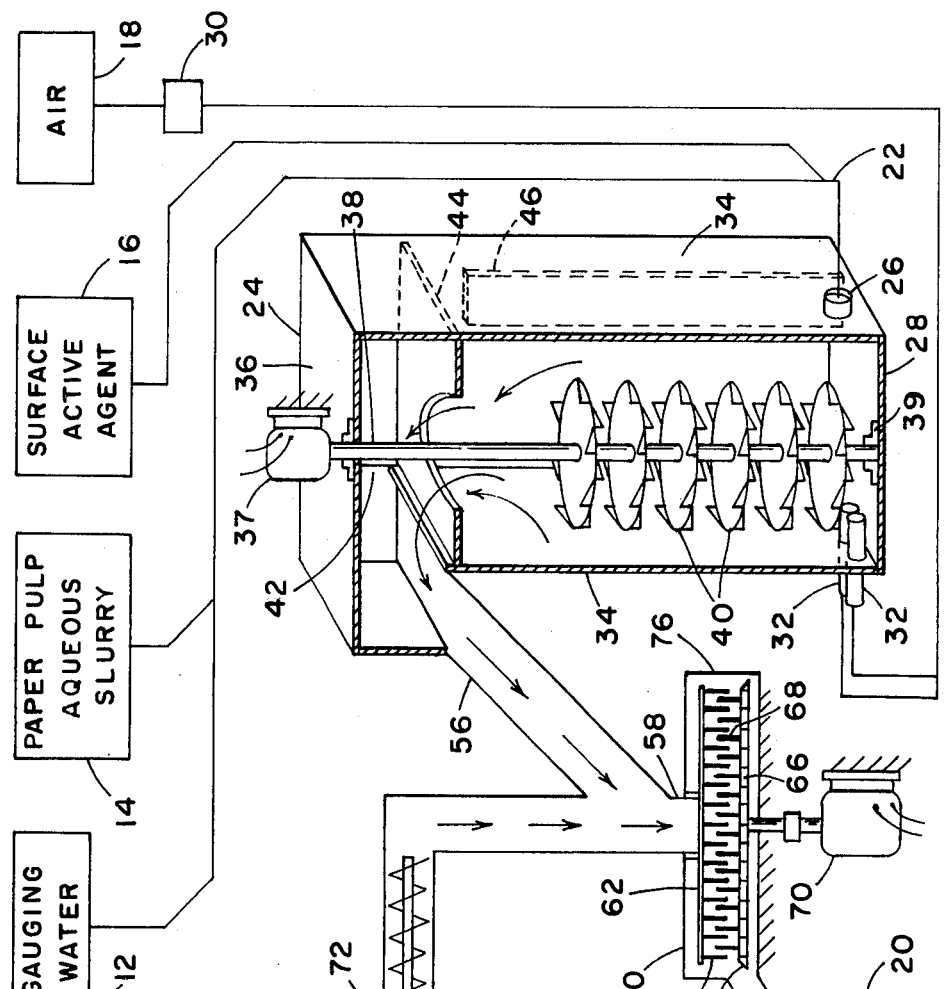
Fig. 1
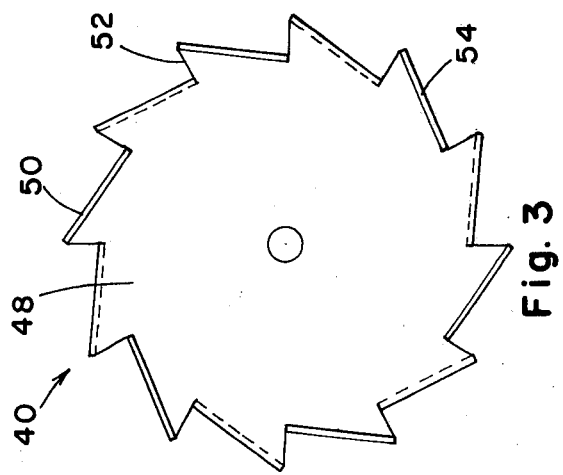
Fig. 2
Fig. 3

FOAMED GYPSUM WALLBOARD

This invention relates to an improvement in the process of making gypsum wallboard, and particularly to the steps of forming a fine, thoroughly dispersed foam within the gypsum core, to reduce the weight of the wallboard.

The methods and apparatus involved in forming foam for inclusion in the gypsum wallboard core have not changed substantially in fifty years, and have been practiced, until the present invention, generally as disclosed in U.S. Pat. No. 2,079,565. This should not be construed to mean that elements of the U.S. Pat. No. 2,079,565, other than those related to forming the foam in the foam generator cells, have been in practice up until the present invention. To the contrary, the method of adding the generated foam to the calcined gypsum has most commonly been carried out in pin mixers, having intermeshed opposed pins, such as in U.S. Pat. No. 2,639,901.

In contrast to the prior foam generator cells, the present invention contemplates passing a major portion of all of the liquids to be used in the gypsum core, if not all of the liquid, through the foam generator, with the surface active agent, and consequently provides a novel foam generator cell structure, capable of far greater degrees of agitation, even under the markedly increased load caused by inclusion of all the liquids during this agitation.

A primary difference in the construction of the foam generator cell of the invention, over prior foam generators, is in the use of high speed rotary agitator discs including a plurality of distinct teeth on the periphery of the discs, with the teeth preferably bent out of the plane of the center portion of the agitator discs. This particular means for agitating the liquids and air and the surface active agent mixture not only produces a large plurality of foam bubbles, but it proceeds to cut bubbles into small and smaller bubbles, and simultaneously disperse the vast multitude of bubbles thoroughly throughout the volume of liquids passing through the foam generator.

Instead of forming low density foams of about 1–20 lbs/ft$^3$ which were relatively difficult to subsequently mix with the calcined gypsum having a loose bulk effective density of about 58 lbs/ft$^3$ and the water of about 62 lbs/ft$^3$, the invention provides for mixing of a foamed liquid of 25 lbs/ft$^3$ or more with the calcined gypsum of 58 lbs/ft$^3$ loose bulk density, a smaller difference which makes for markedly improved mixing.

It is an object of the present invention to provide an improved method of incorporating foam in gypsum wallboard cores, to form lightweight wallboard.

It is a further object of the invention to provide a novel apparatus for preparing a foamed settable gypsum slurry for foaming a wallboard core.

These and other objects and advantages of the present invention will be more fully apparent when considered in relation to the preferred embodiments thereof as set forth in the specification and as shown in the drawings in which:

FIG. 1 is a diagrammatic flow chart of the process of the present invention, including a vertical cross-sectional view of a foam generator cell showing the preferred bent saw-toothed blade agitator discs therein.

FIG. 2 is an enlarged perspective view of an agitator blade of FIG. 1.

FIG. 3 is a top view of the blade of FIG. 2.

Referring to FIG. 1, there is shown a flow chart indicating five ingredients used in the preferred embodiment of the present invention, including finely ground calcined gypsum 10, gauging water 12, an aqueous slurry of paper pulp 14, a surface active agent 16 and a source of air 18, which when combined are continuously fed to wallboard forming equipment 20, to be formed between paper cover sheets into the well known gypsum wallboard.

Of particular importance in the present invention is the combining of all, or at least a major portion, of the liquid components, the surface active agent 16 and air 18, prior to forming a foam with these elements, and prior to these elements being combined with the finely ground calcined gypsum.

In FIG. 1, the gauging water 12, the pulp slurry 14 and the surface active agent 16 are all combined as at 22 and are all fed into foam generator cell 24 at liquid inlet 26 which is closely adjacent the cell bottom 28. Gauging water is that water which is required to bring about the setting reaction of the calcined gypsum, a portion of which water chemically combines with the calcined gypsum and the balance of which must be removed after the wallboard core has set, by passing the wallboard through a dryer. The paper pulp slurry includes an additional considerable amount of water, sufficient to contain and carry with it the disintegrated-paper fibers such as can be produced by agitating in a beater a combination of waste newspaper and water. The water in the pulp slurry is also able to react with some of the calcined gypsum, or it must subsequently be removed from the wallboard in a dryer.

The surface active agent 16 can be any of the known class of chemicals used to form a foam, such as soaps or foaming agents, and, as an example that can be used, there is the sodium salt of sulfated ethoxylated alcohol, sold by Onyx Chemical Company, as a 55% solution in water, under the trademark MILLI-FOAM.

Air 18 is measured and controlled by a rotometer 30 and fed into foam generator cell 24 through a pair of air inlets 32, 32, which are located near the bottom 28 and opposite to the liquid inlet 26. Air inlets 32, 32 are 3/16 inch ($\frac{1}{2}$ cm) inside diameter pipes which extend about 4 inches (10 cm) into the cell 24. The volume-rate of air fed to cell 24 can be calculated from the amount of air voids required in a wallboard core to produce the weight of board desired. The degree of foam breakdown in the mixer must also be considered in such calculation.

The foam generator cell 24 consists of a bottom 28 which is eighteen inches (45 cm) square, four sidewalls 34, which are forty-eight inches (120 cm) high, and a top 36. Disposed over top 36 is a 40 h.p., 1800 RPM motor 37 with a drive shaft 38 extending downward through top 36 to a bearing 39 in bottom 28. Six 12 inch (30 cm) diameter Style G (high vane) Hockmeyer Discperser, blades 40, manufactured by the Big H Equipment Corp., preferably, are mounted on shaft 38, at about 4 inch (10 cm) spacings from about 4 inches to 28 inches (10 cm to 70 cm) from bottom 28. The number of blades can be varied and will depend on the volume rate of foam required for the system. The Style G Hockmeyer high-vaned blade is particularly constructed for providing what is identified as maximum turbulent flow with minimum laminar flow, and is recommended for high speed blending and agitation where low shear is required.

One sidewall 34 has a discharge opening 42 extending from near the top 36 downward 8 inches (20 cm), whereby liquids in cell 24 will be discharged through opening 42 whenever such liquids reach a height of 40 inches (100 cm) from the bottom 28. A baffle plate 44 is disposed in cell 24, in a plane parallel to and 8 inches (20 cm) below top 36. Baffle plate 44 is at or slightly below the bottom of discharge opening 52. Baffle plate 44 has a circular central hole through it of about 9 inches (22 cm) diameter.

A pair 40 inch (100 cm) high and 4 inch (10 cm) wide baffles 46 are affixed to the two opposed walls containing the liquid inlet 26 and the air inlet 32, disposed about 4¼ inches (11 cm) from two diagonal corners, and directed suitably to direct liquid being agitated therein back toward the blades 40.

The blades 40 consist of a circular central disc 48 and perpendicularly directed triangular teeth 50. Teeth 50 are alternatively bent upward and downward from the outer periphery of disc 48, and each has a leading edge 52 which extends about 1¼ inch (3¼ cm) perpendicularly from the plane of disc 48 and an angled trailing edge 54, about 2 inches (5 cm) long. Blades 40 are mounted for rotation at 1800 RPM in a direction such that the leading edges 52 of teeth 50 penetrate the liquid present in cell 24, cutting in half any bubbles encountered by the leading edges 52 in their rotary travel. Teeth 50 are also disposed each in a plane which is tangential at leading edges 52 to central disc 48, whereby liquids are urged radially outward by rotation of blade 40.

The constant feeding of liquids through liquid inlet 26 and of air through air inlet 32 creates a continually rising aerated fluid, with initial bubbles of substantial size, such as about ¼ inch to 1 inch (0.6 cm to 2.5 cm) diameter. As the aerated liquid is forced upward, it passes through the zones of blades 40, which are rotating at 1800 RPM.

The rotating blades create a very high degree of agitation within the liquid, constantly presenting new portions of the liquid to the cutting action of teeth 50. As the air bubbles in the liquid are constantly cut by teeth 50, new, smaller bubbles of greater numbers are created, which are stable, and do not generally revert to the larger bubbles, due to the presence of the surface active agent in the liquid, and the consequent stable bubble walls formed of the surface active agent and water mixture.

The amount of water, pulp and soap passing through cell 24 per unit of time will be dependent upon the weight of the wallboard being produced per unit area and the rate at which the unit area is being produced. The invention may be used in producing gypsum wallboard, ½ inch (1.3 cm) thick, of a weight of 1650 lbs (740 kg) per thousand sq. ft. (92 sq. m). The gypsum core weight will typically be 1530 lbs (680 kg) per MSF, the balance of the weight being the two paper cover liners.

This 1650 lb. wallboard can be produced at a rate of a thousand square feet every 2¼ minutes, which is approximately 660 lbs (300 kg) per minute or 610 lbs (270 kg) of gypsum core per minute. Assuming a 90% purity of the calcined gypsum being used to produce this gypsum core, there is required about 216 lbs (96 kg) per MSF, or 86 lbs (38 kg) per minute, of water to chemically combine with the calcined gypsum to produce set gypsum, and about 860 lbs (380 kg) per MSF, or 342 lbs (154 kg) per minute, of additional water to form the wallboard, which additional water must be removed in the dryer.

This makes a total of 428 lbs (192 kg) of water per minute required in producing the ½ inch gypsum wallboard of 1650 lbs per MSF total weight. This 428 lbs of water per minute can be supplied to the foam generator cell 24 by starting with about 214 lbs of gauging water and about 214 lbs of water in the paper pulp agueous slurry, or almost any other ratio of gauging water to pulp slurry water, depending on the consistency desired in the pulp slurry. Higher water temperatures up to a maximum of about 120° F (50° C) are advantageous, but not essential.

The amount of paper pulp used in the pulp slurry is preferably about 4 lbs (1.8 kg) per minute, and may be varied considerably or even eliminated in accordance with the invention. The amount of surface active agent used per minute, if MILLI-FOAM solution is used, is about ½ lb (0.23 kg) per minute, and may be varied from about 0.1–1.0 lb. (0.05–0.5 kg) per minute.

Other ingredients of the wallboard core that will commonly be added will include about 2 lbs (0.9 kg) of set accelerator per minute, about ½ lb (0.23 kg) of a water-reducing agent, and about 2 lbs (0.9 kg) of starch. The set accelerator may be freshly ground gypsum or potassium sulfate or a combination thereof. The water-reducing agent may be any of a number of solid or aqueous solution forms of calcium or sodium lignosulfonates, or mixtures thereof. The freshly ground set gypsum, the water-reducing agent and the starch should preferably not be added to the liquid portion until after this portion is discharged from the foam generator cell 24, whereas the potassium sulfate may be added to the liquid at any point in the process.

The calculated volume of air desired in the 1650 lb. wallboard is 13.3 cubic feet (0.38 cubic meters) per MSF, or approximately 5.3 cubic feet (15 cubic meters) per minute, as the wallboard is being formed. Actual input of air into cell 24 will have to take into account the amount of breakdown of foam in the process between generating the foam and forming the wallboard.

The discharge portion of the cell 24 includes opening 42 and chute 56. Chute 56 directs the foamed liquid from cell 24 to inlet 58 of a pin mixer 60, shown diagrammatically with a fixed upper plate 62 with downwardly projecting pins 64 and a bottom rotary plate 66 with upwardly projecting intermeshing pins 68. Bottom plate 66 is affixed to a suitable drive motor 70, and has a saw-toothed edge 71.

The finely ground gypsum 10 is fed to a feeder 72 driven by motor 74. Feeder 72 permits controlled feeding of the gypsum powder to the pin mixer inlet 58. Pin mixer 60 is shown with a single central top inlet for all ingredients, however the pin mixer can have separate inlets and the inlets do not need to be located at the center but must be located inwardly of the outer periphery 76 of the pin mixer. The rotary action of the bottom plate urges the materials to move radially outward, and subjects the material to a mixing action produced by the intermeshing pins and/or the saw-toothed edge 71 formed on bottom plate 66.

The pin mixer has one or more outlets 78 through which the mixed calcined gypsum and liquids flow, to reach the wallboard producing equipment 20.

In the above preferred embodiment of the invention, all of the water for the gypsum core is subjected to the very turbulent foam in cell 24. The most common prior practice involved the use of only a very minor portion of the water in foaming, sufficient to form a stable froth, and then mixing this froth with the balance of the water and the calcined gypsum during the mixing action in the pin mixer. This involved the mixing of a very low density ingredient with a very high density ingredient. This is either a relatively difficult or a relatively inefficient process.

The present invention contemplates that less than all of the water can be subjected to the foaming action; for example, if half of the water or more is foamed, the density of the foamed water is still relatively close to the loose bulk density of the calcined gypsum, and very much more dense than the above referred to stable froth. Up to about half of the water to be incorporated in making the wallboard can be added unfoamed to the foamed water by blending it with this foamed water which will have been subjected to the above-described foaming action, which blending should be done with a blender providing sufficient shearing action to thoroughly blend the two components. The water which bypasses the foam generator cell can be either gauging water 12 or paper pulp aqueous slurry 14. The density of the foamed water should be at least 25 lbs/cu. ft.

Attempts to perform the foaming action in the presence of a majority of the total water usage, using the prior foam generator cells with circular discs on the impeller shaft, as taught in U.S. Pat. No. 2,079,565, with some or even all of the discs notched, were very inefficient in that a considerable excess of surface active agent, which can be detrimental in a wallboard core, is necessary to obtain a usable quantity of foam. With high turbulence blades, with a plurality of peripheral teeth bent out of the plane of the center of the blade, substantially no more surface active agent is needed for producing the desired quantity of air in extremely fine bubbles than is required in making froth with the relatively minimum quantity of water. Preferably, the teeth are also formed to present a leading cutting edge 52 to double and redouble repeatedly the number of bubbles, reducing the size of bubbles in the liquid, utilizing to the fullest extent the surface active agent present, and developing a most thorough distribution of the foam in the liquid.

Having completed a detailed disclosure of the preferred embodiments of our invention, so that others may practice the same, we contemplate that variations may be made without departing from the essence of the invention.

We claim:

1. The continuous method of making lightweight gypsum wallboard in which a foam is continuously produced by foaming air bubbles in an aqueous solution of a surface active agent, comprising the steps of continuously admixing a surface active agent with a major portion of the water to be used in forming said gypsum wallboard, subjecting the said mixture to maximum turbulent flow agitation while simultaneously continuously adding air thereto, said subjecting to agitation including moving said mixture upward through a foam generator cell wherein said mixture is subjected to a plurality of spaced, coaxial, rotary high vaned blades each having a central disc portion and a plurality of teeth disposed around the periphery of said disc, said teeth extending out of the plane of said disc and having a relatively short leading edge and a relatively long trailing edge, said leading edge extending substantially perpendicularly from the plane of said central disc portion, said teeth being arranged relative to the disc periphery at an angle such that during rotation said teeth induce radially outward movement of said mixture, and subsequently admixing finely ground calcined gypsum with the foamed liquid product of said agitation, forming said gypsum and foamed liquid mixture into lightweight foamed core gypsum wallboard.

2. The method of claim 1 wherein substantially all of the water used in making gypsum is subjected to said maximum turbulent flow agitation.

3. The method of claim 1 wherein said foamed liquid product of said agitation has a density of at least 25 lbs/ft$^3$.

4. Apparatus of making gypsum wallboard comprising means for supplying liquid ingredients of said gypsum wallboard, means for supplying finely ground calcined gypsum, means for mixing said liquid ingredients and said calcined gypsum, means for combining a surface active agent and air with a major portion of said supply of liquid and means for subjecting said combination of surface active agent, air and liquid to an agitation consisting of maximum turbulent flow and minimum laminar flow prior to being mixed with said calcined gypsum, said means for agitation comprising a foam generator cell having liquid and air inlet means near the bottom of said cell, an outlet near the top of said cell, and agitation means including a vertical drive shaft with an agitator blade thereon, said blade having a plurality of teeth extending outward from a center portion of said blade, said teeth being disposed in respective planes suitable for cutting action through the liquid in said cell when said blade is rotated, and such that said teeth induce radially outward motion to liquid in said cell when said blade is rotated.

5. Apparatus as defined in claim 4 wherein said means for agitation includes rotary blades having a plurality of teeth formed on the outer periphery of a central portion thereof, said teeth being alternately directed upwardly and downwardly and having a vertical extent of at least about one inch, said teeth having a triangular shape with a vertical leading edge and being disposed in a plane at an acute angle to a tangential plane.

* * * * *